US011377605B2

(12) United States Patent
Partridge et al.

(10) Patent No.: US 11,377,605 B2
(45) Date of Patent: Jul. 5, 2022

(54) MOLECULAR SEPARATIONS PROCESS

(71) Applicant: ExxonMobil Technology and Engineering Company, Annandale, NJ (US)

(72) Inventors: Randall D. Partridge, Califon, NJ (US); Benjamin A. McCool, Annandale, NJ (US); Carla S. Pereira, Bridgewater, NJ (US); Dhaval A. Bhandari, Bridgewater, NJ (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 294 days.

(21) Appl. No.: 16/839,344

(22) Filed: Apr. 3, 2020

(65) Prior Publication Data
US 2020/0325406 A1 Oct. 15, 2020

Related U.S. Application Data

(60) Provisional application No. 62/832,930, filed on Apr. 12, 2019.

(51) Int. Cl.
*C10G 67/14* (2006.01)
*C10G 65/12* (2006.01)
(Continued)

(52) U.S. Cl.
CPC ......... *C10G 67/14* (2013.01); *B01D 15/1828* (2013.01); *B01D 61/145* (2013.01);
(Continued)

(58) Field of Classification Search
CPC ........ C10G 67/14; C10G 65/04; C10G 65/12; C10G 2300/1037; C10G 2300/202; C10G 2300/205; C10G 2300/206; C10G 2300/308; C10G 2400/30; B01D 15/1828; B01D 61/145; B01D 61/025;
(Continued)

(56) References Cited

U.S. PATENT DOCUMENTS 2,701,786 A 2/1955 Evans et al.
8,177,965 B2 5/2012 Leta et al.
(Continued)

OTHER PUBLICATIONS

Beveridge J. Mair and Joseph D. White, "Separation of Petroleum Hydrocarbons with Silica Gel", National Bureau of Standards, Jul. 1935, vol. 15.
(Continued)

*Primary Examiner* — Randy Boyer
*Assistant Examiner* — Juan C Valencia
(74) *Attorney, Agent, or Firm* — Robert A. Migliorini

(57) ABSTRACT

A molecular separation method can include: passing a deasphalted oil stream through a reactor containing an active substrate, wherein the catalytic active substrate adsorbs heteroatom species from the deasphalted oil stream and produces a pretreated hydrocarbon feed stream essentially free of 4+ ring aromatic molecules (ARC 4+ species), metal species, and heteroatom species; and chromatographically separating with a simulated moving bed apparatus or a true moving bed apparatus (SMB/TMB) the pretreated hydrocarbon feed stream into a saturate fraction and an aromatics fraction.

19 Claims, 10 Drawing Sheets

(51) Int. Cl.
  *C10G 65/04* (2006.01)
  *B01J 19/24* (2006.01)
  *B01J 10/00* (2006.01)
  *B01D 15/18* (2006.01)
  *B01D 61/14* (2006.01)

(52) U.S. Cl.
  CPC .............. *B01J 10/007* (2013.01); *B01J 19/24* (2013.01); *C10G 65/04* (2013.01); *C10G 65/12* (2013.01); *C10G 2300/1037* (2013.01); *C10G 2300/202* (2013.01); *C10G 2300/205* (2013.01); *C10G 2300/206* (2013.01); *C10G 2300/308* (2013.01); *C10G 2400/30* (2013.01)

(58) Field of Classification Search
  CPC .............. B01D 61/027; B01D 2311/06; B01D 2311/08; B01D 2311/2626; B01D 2311/2696; B01D 2313/40; B01J 10/007; B01J 19/24
  See application file for complete search history.

(56) References Cited

U.S. PATENT DOCUMENTS

| | | | |
|---|---|---|---|
| 2009/0120842 A1* | 5/2009 | Koseoglu | C10G 25/003 202/153 |
| 2010/0218585 A1 | 9/2010 | Chawla et al. | |
| 2011/0253595 A1 | 10/2011 | Hamad et al. | |
| 2014/0155672 A1* | 6/2014 | Etienne | B01J 20/186 585/828 |

OTHER PUBLICATIONS

Beveridge J. Mair and Alphonse F. Forziati, "Separation And Recovery Of Aromatic Hydrocarbons From Paraffins And Naphthenes By Adsorption", Research Paper RP1583, National Bureau of Standards, Apr. 1944, vol. 32.

* cited by examiner

MOLECULAR SEPARATIONS PROCESS

FIELD

Exemplary embodiments described herein relate to a system and method for separating whole crude oil or crude oil fractions by reactive chromatography.

BACKGROUND

A petroleum refinery has conventionally been built around thermal phase change-based separation processes with atmospheric and vacuum distillation being at the front end of the refinery. Indeed, in the current state of the art distillation is the cornerstone of all refining processes. So much so that refining streams and downstream processes and products are often designed for and defined in terms of boiling point ranges. In a typical distillation process desalted crude is first fed to an atmospheric and then a vacuum distillation column. Distillation separates based on differences in relative volatility involving phase change and vapor-liquid equilibrium. In other words, the crude oil is heated so that each fraction evaporates or boils and then condenses in its own compartment of the distillation column. Heat is removed from this condensation in the overhead condenser at much lower temperature than the furnace used to add the heat. Such heat is often a waste energy with very little value in terms of heat integration. The product cuts range from low boiling point molecules to high boiling molecules with increasing carbon numbers, for example, light ends ($C_1$-$C_4$), naphtha ($C_5$-$C_{12}$), jet fuel/kerosene ($C_{12}$-$C_{17}$), diesel ($C_{17}$-$C_{35}$), lubricants or lubes ($C_{35}$-$C_{60}$), and asphalt ($C_{60}$-$C_{200+}$). Distillation consumes significant amounts of energy and has significant carbon and area footprints. Following distillation, a range of conversion processes change the size and structure of the hydrocarbon molecules. Some of the conversion processes include the following.

Cracking—breaking down large molecules into smaller molecules using catalysts, with or without hydrogen. Examples include cat cracking, hydrocracking, and coking. Fluid catalytic cracking (FCC) converts vacuum gas oil to gasoline and distillates that are obtained by further distillation of the FCC products. Hydrocracking upgrades vacuum gas oils to distillates, and is usually preceded by hydrotreating to remove sulfur and nitrogen, and again final products are obtained by distillation. Vacuum residue is further upgraded by coking or gasification, also followed by distillation.

Reforming—rearranging molecules into different geometric structures such as in isomerization, dehydrogenation, dehydrocyclization, hydrocracking, and related processes. Reforming of the naphtha fraction is used to improve octane rating for gasoline and to provide aromatics for chemicals.

Synthesis—building smaller molecules into larger molecules such as in alkylation and polymerization.

Treatment processes—preparing streams after pre-post distillation and conversion processes for additional processing and to prepare finished products. Often chemical and physical separation is utilized to meet the criteria. Processes include desalting, hydrodesulfurization, solvent treating/extraction, gas sweetening ($CO_2$ and $H_2S$ removal), and dewaxing.

Blending—mixing and combining hydrocarbon fractions with each other and/or additives to realize finished products with specific product specifications. Often this is the last step in refining.

Often times the conversion processes have to take in streams that are provided by the front end distillation columns and are not always the ideal streams. The streams obtained are based on boiling point and not necessarily by the molecular class. Each boiling point based product has a mixture of aromatics, paraffins, and naphthenic molecules along with heteroatom species. As used herein, the term "heteroatom species" refers to compounds comprising one or more heteroatoms. Examples of heteroatoms include, but are not limited to, oxygen, sulfur, nitrogen, and halides.

The mixture of various classes of molecules in a stream based on boiling point leads to unoptimized processing and sometimes inappropriate disposition of molecules towards the final products. For example, high molecular weight paraffinic molecules, which are highly valued as a lube feedstock, end up in the vacuum resid stream along with multi-ring aromatic molecules due to their high boiling point. In the naphtha reforming process, $C_6$-$C_{12}$ paraffins and naphthenic molecules are the preferred feeds, the aromatic molecules are inerts, while smaller carbon number paraffinic molecules can crack to form undesired light gases. Often times, various undesired heteroatom species (e.g., sulfur or nitrogen containing polar species such as carabazoles and dibenzothiophenes) are distributed to multiple downstream conversion processes by the front end distillation columns which separates molecules based on their boiling points. This often necessitates multiple hydroprocessing units before/after the conversion processes where the heteroatom species are often poisons to the catalysts. Hence there is a need to re-imagine the front end refinery separations in order to separate molecules based on their molecular class and size rather than on the basis of boiling. Apart from improving the quality of the separations, it is also desirable to reduce the energy consumption in the refinery by finding lower energy separations solutions.

SUMMARY

Exemplary embodiments described herein relate to a system and method for separating whole crude oil or crude oil fractions by reactive chromatography.

A first example embodiment is a molecular separation method comprising: passing a deasphalted oil stream (e.g., a deasphalted crude oil or any deasphalted fraction of crude oil) through a reactor containing an active substrate, wherein the catalytic active substrate adsorbs heteroatom species from the deasphalted oil stream and produces a pretreated hydrocarbon feed stream essentially free of 4+ ring aromatic molecules (ARC 4+ species), metal species, and heteroatom species; and chromatographically separating with a simulated moving bed apparatus or a true moving bed apparatus (SMB/TMB) the pretreated hydrocarbon feed stream into a saturate fraction and an aromatics fraction.

A second example embodiment is a separation system comprising: a reactor fluidly configured to receive a deasphalted oil stream (e.g., a deasphalted crude oil or any deasphalted fraction of crude oil), wherein the reactor contains a catalytic active substrate that adsorbs heteroatom species from the deasphalted oil stream and produces a pretreated hydrocarbon feed stream essentially free of the ARC 4+ species, the metal species, and the heteroatom species; and a chromatographic separator fluidly coupled to the reactor and configured to receive the pretreated hydrocarbon feed stream and produce a saturate fraction and an aromatics fraction, wherein the chromatographic separator is a simulated moving bed apparatus or a true moving bed apparatus (SMB/TMB).

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DESCRIPTION

Figure 1:
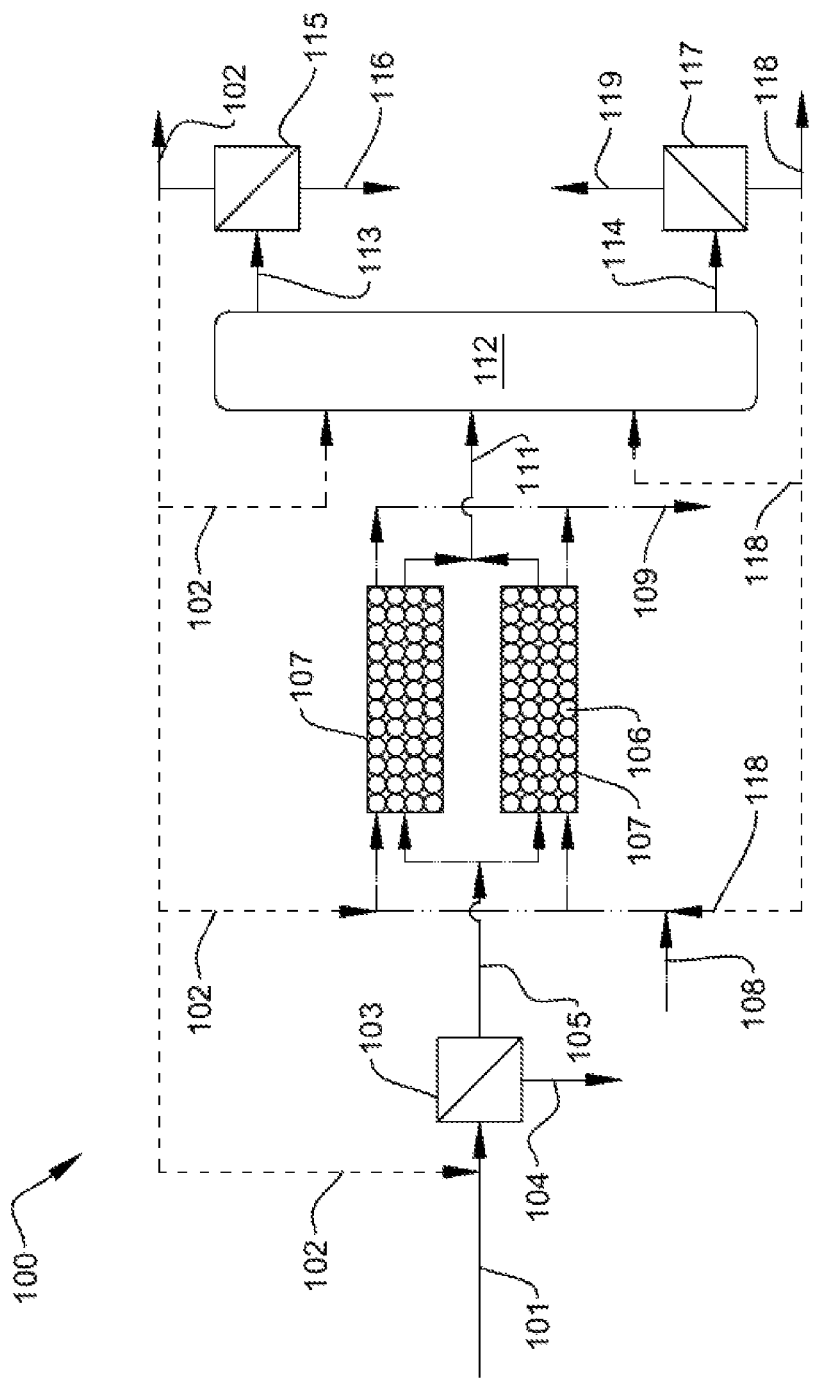
FIG. 1 illustrates a system for molecular separation of crude oil.

Overall, distillation is the most energy intensive process in refining and chemical plants. Petroleum refining has been built upon the fractionation of crude oil into boiling point fractions. Large, energy intensive distillation towers generate these fractions, which are then subjected to an array of physical and chemical processes to produce the product slate of modern refinery.

Provided herein are systems and methods that utilizes a unique combination of non-phase change based separation media for fractionating whole crude and/or its various components into appropriate class- and size-based streams, which can then be sent to different conversion processes to get finished products allowing for a simplified and low energy processing. These systems and methods allows operators to potentially re-imagine hydrocarbon processing.

Exemplary embodiments are described herein. However, to the extent that the following description is specific to a particular embodiment, this is intended to be for exemplary purposes only and simply provides a description of the exemplary embodiment. Accordingly, the invention is not limited to the specific embodiments described below, but rather, it includes all alternatives, modifications, and equivalents falling within the true spirit and scope of the appended claims.

Overview

The crude oil or hydrocarbon feeds for use in the methods and systems of the present disclosure are first de-asphalted to remove metal species (e.g., metals associated with high molecular size asphaltenes and highly aromatic molecules). This can be accomplished by using conventional solvent-based de-asphalting or other non-conventional techniques like membranes. As used herein, the term "metal species" refers to compounds comprising one or more metal atoms, which may be organic compounds or inorganic compounds.

In the present technological advancement, the product is then fed to a reactive adsorption-based hydrotreater and/or hydrocracker followed by a simulated moving bed chromatography technology to produce a saturate stream and an aromatics stream. Advantageously, solvent can be extracted from the saturate stream and the aromatics stream and by hydrocarbon nanofiltration or reverse osmosis, which is a process that does not require significant amounts of energy. Further, the solvents extracted by HCRO from the saturate and aromatics streams can be recycled back into different portions of the methods and systems of the present disclosure. This approach can remain in a reducing environment, which simplifies the process and improves the safety of operations.

The present technological advancement can provide a new approach to processing crude oil or hydrocarbon feeds based on molecular class and size separation and up-front heteroatom species removal/conversion. The present technological advancement can employ (a) a combination of ultrafiltration, hydrocarbon nanofiltration (NF), and/or hydrocarbon reverse osmosis membranes (HCRO), (b) reactive adsorption processes, and (c) chromatographic separations (e.g., simulated moving bed (SMB) and real moving bed separations).

The present technological advancement can provide a process for (a) separating whole crude oil or crude oil fractions by reactive chromatography in fixed, moving, or simulated moving bed configurations, (b) using solvents recovered by hydrocarbon reverse osmosis or nanofiltration, and (c) regeneration of at least a portion of the separation media using hydrogen. The process provides separated crude oil fractions enriched in saturates and aromatics that are essentially free of heteroatom species and metal species (e.g., metals associated with high molecular size asphaltenes). For example, the metal species are removed prior to the adsorptive separation process by nanofiltration. The separated fractions are considerably easier to process in the refinery and provide opportunities to increase both yield and quality of refined products. In particular, the present technological advancement can integrate nanofiltration and hydrocarbon reverse osmosis (e.g., to remove metal-containing asphaltenes) with sorptive processes to remove heteroatom species and chromatographic separation technologies (e.g., to separate aromatics from saturates).

In particular, the present technological advancement can use counter-current adsorption by a moving bed contactor or SMB to separate aromatics from saturates. Solvents recovered from the separated fractions by nanofiltration or hydrocarbon reverse osmosis can be used to carry out the separations.

Definitions

For purposes of the description of the present technological advancement and the claims attached hereto, the numbering scheme for the Periodic Table Groups is according to the IUPAC Periodic Table of Elements.

The term "and/or" as used in a phrase such as "A and/or B" herein is intended to include "A and B", "A or B", "A", and "B".

As used herein, and unless otherwise specified, the term "$C_n$" means hydrocarbon(s) having n carbon atom(s) per molecule, wherein n is a positive integer.

As used herein, the term "oil" refers to petroleum that exists in the liquid phase in natural subsurface formations and remains liquid at atmospheric conditions of pressure and temperature. Petroleum refers to a complex mixture of hydrocarbons, chemical compounds containing only hydrogen and carbon, with small amounts of other substances. Such other substances may include, for example, oxygen ($O_2$), hydrogen sulfide ($H_2S$), and nitrogen ($N_2$).

As used herein, and unless otherwise specified, the term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n.

As used herein, "molecular weight" refers to the weight average molecular weight (Mw). Unless otherwise noted, all molecular weight units are g/mol.

Ranges can be expressed herein as from "about" or "approximately" one particular value and/or to "about" or "approximately" another particular value. When such a range is expressed, another embodiment includes from the one particular value and/or to the other particular value.

Example Embodiments

FIG. 1 illustrates an exemplary system 100 for molecular separation. A hydrocarbon feed stream 101 can be crude oil or any fraction of crude oil. While any crude oil composition can be used with the present technological advancement including those with higher concentrations of metal species and/or asphaltenes, preferred feedstocks include whole petroleum crude oils that are low in metal species and heptane asphaltenes. As used herein, the term "heptane asphaltenes" refers to asphaltenes that do not dissolve in n-heptane but do dissolve in aromatics like toluene and xylene.

One way of defining a feedstock is based on the boiling range. One option for defining a boiling range is to use an initial boiling point for a feed and/or a final boiling point for a feed. Another option, which in some instances may provide a more representative description of a feed, is to characterize a feed based on the amount of the feed that boils at one or more temperatures. For example, a "T5" boiling point for a feed is defined as the temperature at which 5 wt % of the feed will boil off. Similarly, a "T50" boiling point is a temperature at 50 wt % of the feed will boil. The percentage of a feed that will boil at a given temperature can be determined by the method specified in ASTM D2887-18. Hydrocarbon feed streams 101 that are considered whole waxy crudes suitable for the methods and systems described herein include, for example, feeds with an initial boiling point of at least 70° F. (21° C.), or at least 100° F. (37° C.), or at least 125° F. (51° C.).

In some aspects, the content of heptane asphaltenes in the hydrocarbon feed stream 101 can be less than 2.0 wt %, or less than 1 wt %, or less than 0.5 wt %, or less than 0.25 wt %, based on the total weight of the feedstock. The content of heptane asphaltenes in the 1050° F.+ (565° C.+) fraction of the hydrocarbon feed stream 101 is less than 5.0 wt %. The hydrocarbon feed stream 101 may have a metals content of less than 50 ppm, or less than 20 ppm, or less than 15 ppm, or less than 10 ppm, or less than 5 ppm and a content of carbonaceous residue of less than 2.0 wt %, or less than 1.5 wt %, or less than 1.0 wt %, or less than 0.5 wt %, as measured by the micro carbon residue test defined in ASTM D4530-15. As used herein, a metals content is a content of the metal specifically and not the atoms associated therewith in the metal species.

As illustrated, the hydrocarbon feed stream 101 is deasphalted oil as a first step. In conventional distillation, the asphaltene molecules are often heated multiple times and end up in the vacuum residue stream where they are processed as fuel oil, sent to a coker to make asphalt, or sent to a propane or pentane deasphalter to remove deasphalted oil to make base stocks. Whole crude is seldom deasphalted using conventional solvent-based deasphalting process because in the whole crude the asphaltenes are more dilute than in a concentrated vacuum resid. Accordingly, treating the vacuum resid requires a much reduced volume. A solvent extraction process requires about 3:1 solvent to feed ratio or more and is quite energy intensive due to significant amount of solvent recovery by distillation that is involved. While any deasphalting system or method can be used, a preferred embodiment utilizes a membrane to remove 4+ ring aromatic molecules (ARC 4+ species), metal species, and other asphaltene molecules. A membrane, more typically an ultrafiltration range membrane is the most suitable. A membrane process can be operated up to high product yield (70% to 95%) with only pressure based pumping energy provided and without the need to boil the molecules just like in distillation. The membrane separation can be enhanced by co-feeding a solvent range saturate (a mixture of saturated hydrocarbons (e.g., typically $C_5$ to $C_{12}$) having an average molecular size that is lower than that found in the feed to the membrane). This co-feed can be a solvent-range saturates stream 102 (e.g., typically $C_5$ to $C_{12}$ saturated hydrocarbons) recycled from a saturate separation step later in the system 100.

Separation of heavy hydrocarbon streams with ultrafiltration is described in the prior art, such as in U.S. Pat. Nos. 7,736,493; 7,837,879; 7,867,379; 7,871,510; 7,897,828; 7,931,798; 7,943,037 and 8,177,965, 8,845,886 and 8,864,996, all of which are incorporated by reference. The focus of these patents has been mostly on metals, micro-carbon residue (MCR), asphaltenes rejection, and saturates or paraffin enrichment. The type of feeds considered in these patents range from crude (whole, topped, synthetic, shale based, bitumen or tar sands based) to steam cracker tar, atmospheric or vacuum pipestill resid. The range of applications considered are heavy oil upgrading, fluid catalytic cracker (FCC) feed upgrading, deasphalter debottleneck, vacuum pipestill debottleneck, steam cracker tar upgrading, upgrade of visbroken residue, asphalt production, and enhanced coker feed preparation. U.S. Pat. No. 7,351,873 discusses removal of color bodies and/or asphalthenic contaminants from a liquid hydrocarbon mixture. U.S. Pat. No. 5,256,297 discusses a two-stage membrane process for MCR, metals and asphaltene removal from heavy hydrocarbon feed where the permeate from the first membrane stage is fed to a second membrane stage to enable better separation in preparation for FCC feed. U.S. Publication No. 2016/0158703 describes a membrane cascade for Rh catalyst recovery from homogeneously catalyzed mixtures for hydroformylation process. U.S. Publication No. 2011/0049034 describe a modular cross flow filtration system with multiple stages of filtration. U.S. Pat. No. 6,156,950 describes a permeation separation and or adsorption based process to separate straight and mono-branched $C_5$-$C_8$ paraffins from a $C_{7+}$ hydrocarbon stream with preferential rejection of multi-branched paraffins with optional rejection of naphthenic and aromatic species. The use of eluent for regenerating said adsorption unit or a flushing gas for regenerating said permeation separation unit is also described.

While the illustrated system 100 includes asphaltene removal on-site, asphaltene removal can be carried out at any time or location prior to the crude reaching the refinery (see, for example, U.S. Patent Application Publication No. 2018/0355708, which describes asphaltene removal at the site of hydrocarbon production).

The hydrocarbon feed stream 101 optionally mixed with the solvent-range saturates stream 102 can be separated into two streams, a retentate stream 104 and a permeate stream 105, by a nanofiltration or ultrafiltration membrane 103 under pressure ranging from 1 MPa to 20 MPa, or 1 MPa to 10 MPa, or 5 MPa to 15 MPa, or 10 MPa to 20 MPa and temperature ranging from 20° C. to 300° C., or 20° C. to 100° C., or 75° C. to 200° C., or 150° C. to 300° C.

The membrane 103 can include average pore sizes ranging from 1 nm to 100 nm, or 1 nm to 10 nm, or 1 nm to 2 nm. Suitable materials for the membrane 103 include, but are not limited to, polymers, metals, zeolites, supported polymer films, and controlled porosity ceramics. Those of ordinary skill in the art can select appropriate commercially available membranes and materials thereof.

The degrees of asphaltene and metal species removal can depend on solvent-range saturates stream 102 composition. The degree of asphaltene (e.g., ARC 4+ species) removal can be greater than 90 wt % rejection, or 90 wt % to 100 wt %, or 90 wt % to 99 wt %, or 95 wt % to 100 wt %, or 95 wt % to 99 wt %, or 99 wt % to 100 wt %. The degree of metal species removal can be greater than 90 wt % rejection based on metal weight, or 90 wt % to 100 wt %, or 90 wt % to 99 wt %, or 95 wt % to 100 wt %, or 95 wt % to 99 wt %, or 99 wt % to 100 wt %. While membranes can independently reject these molecules, having a saturate solvent recycle can accelerate the potential precipitation of asphaltene molecules leading to improved rejections.

While the membrane does not provide high rejection of heteroatom species, the membrane can reject heteroatom species that are a part of or associated with a high molecular weight compound. The degree of heteroatom species (e.g., sulfur-containing species, nitrogen-containing species, and/or oxygen-containing species) removal can be greater than 25% rejection based on heteroatom weight (e.g., sulfur, nitrogen, and/or oxygen), or 25% to 99%, or 25% to 50%, or 25% to 75%, or 50% to 99%, or 75% to 99%.

The retentate stream 104 can be enriched in ARC 4+ species, metal species, heteroatom species, and any combination thereof. The retentate stream 104 can be further treated, for example, in a coker, deasphalter, or visbreaker. The asphaltene removal in FIG. 1 does not necessarily need to be performed at a refinery.

The membrane 103 can operate at a product yield of 70 wt % to 95 wt % permeate relative to the total weight of hydrocarbon feed stream 101 optionally mixed with the solvent-range saturates stream 102. The permeate stream 105, which comprises a deasphalted hydrocarbon feed substantially free of metals (e.g., nickel and vanadium), from the membrane 103 can be processed further by adsorption on one or more catalytic active substrates 106 in a reactor 107.

The catalytic active substrates 106 include an adsorbent that can, for example, remove polar heteroatom species. In conventional hydrotreaters, the entire feed is hydrotreated, which, apart from converting sulfur and nitrogen containing species to $H_2S$ and $NH_3$, saturates many unsaturated molecules such as aromatics and olefins in the feed. This leads to higher hydrogen consumption in the process. Further, in conventional hydrotreating or hydrocracking, a flow of heteroatom-containing oil is maintained over the catalyst with conditions adjusted to maintain a rate of conversion to achieve the desired level of heteroatom species removal. In contrast, the methods and systems of the present disclosure concentrate heteroatom species in the reactors 107 and allow saturates and aromatics to pass through. Then, hydrotreating or hydrocracking is performed on the hydrocarbon feed comprising a high concentration of heteroatom species in the reactor.

In the illustrated example, the separation process flow is illustrated with solid arrows, the hydrotreating or hydrocracking process flow is illustrated with dash/double dot arrows, and optional flows are illustrated with dash arrows.

The catalytic active substrates 106 can be hydrotreating and hydrocracking catalyst compositions. For example, the support of such catalyst compositions can act to adsorb heteroatom species and the metal catalyst on the support can later be used in the hydrotreating or hydrocracking process. Examples of catalytic active substrates 106 include, but are not limited to, CoMo, NiMo, Pd, Pt, and the like, optionally partially sulfide, and any combination thereof on a silica, alumina, aluminosilicate, zeolite, or mesoporous support. More than one compositions of catalytic active substrates 106 can be included in the reactor 107.

The reactor 107 can be a suitable vessel that is designed to handle the temperatures and pressures needed to carry out the desired hydrotreating and hydrocracking reactions. While nitrogen and sulfur species are provided here as examples, the present technological advancement can work with other heteroatom containing complex organic compounds.

When the catalytic active substrates 106 is saturated or nearly saturated or at a desired cycle time, the corresponding reactor 107 can be transitioned from the separation process flow to the hydrotreating or hydrocracking process flow with appropriately placed valves (not illustrated). The illustrated example includes two reactors, which allows for continuous separation operation because each reactor 107 can individually be transitioned to the hydrotreating or hydrocracking process flow while the other remains in separation process flow. The number of reactors can be as many as needed to process the volume of the permeate stream 105 (or akin feed stream if deasphalting is handled at another location).

In the hydrotreating or hydrocracking process, the adsorbed heteroatom species are removed with the addition of hydrogen stream 108 to generate an output stream 109 comprising the product of the heteroatom species reaction with hydrogen (e.g., ammonia, hydrogen sulfide, water, light hydrocarbons, and the like, and any combination thereof). The desired hydrotreating or hydrocracking reactions occur by introducing pressurized hydrogen flow 108 and heat to raise the reactor temperature for the hydrotreating or hydrocracking. Hydrotreating or hydrocracking conditions to regenerate the catalytic active substrates 106 can include, but are not limited to, a pressure of 1 MPa to 20 MPa, or 1 MPa to 10 MPa, or 5 MPa to 15 MPa, or 10 MPa to 20 MPa; a temperature from 100° C. to 450° C., or 100° C. to 250° C., or 200° C. to 350° C., or 300° C. to 450° C.; and a time of 0.1 hours to 10 hours, or 1 hour to 5 hours, or 2 hours to 10 hours.

Optionally, the solvent-range saturates stream 102 and/or a solvent-range aromatics stream 118 described below can be used in the hydrotreating or hydrocracking process. Such solvent streams 102 and 118 can be used to carry away hydrocarbon reaction products that are no longer so strongly adsorbed.

While this example uses a catalytic active substrates 106, the adsorbent used need not be catalytically active. Examples of such active substrates that are active to adsorption of heteroatom species but not necessarily catalytically active can include, but are not limited to, titanias, silicas, aluminas, aluminosilicates, zeolites, activated carbons, organosilicas, metal organic frameworks, covalent organic frameworks, and the like, and any combination thereof.

Alternatively, a solvent (e.g., the solvent-range saturates stream 102 and/or the solvent-range aromatics stream 118) could be used to desorb or displace the adsorbed heteroatom species as a concentrated stream for processing separately, for example, in a hydrotreating or hydrocracking reactor.

Referring again to the separation process, the pretreated hydrocarbon feed stream 111 from reactor 107 is the remaining hydrocarbon feed essentially free of metal species (less than 10 wt %, or 0 wt % to 10 wt %, 0.1 wt % to 5 wt %, or 0 wt % to 1 wt % metal remaining based on the wt % metal in the hydrocarbon feed stream 101), essentially free of heteroatom species (e.g., less than 10 wt %, or 0 wt % to 10 wt %, 0.1 wt % to 5 wt %, or 0 wt % to 1 wt % heteroatom remaining based on the wt % heteroatom in the hydrocarbon feed stream 101), and essentially free of asphaltenes (e.g., less than 10 wt %, or 0 wt % to 10 wt %, 0.1 wt % to 5 wt %, or 0 wt % to 1 wt % asphaltenes remaining based on the wt % asphaltenes in the hydrocarbon feed stream 101).

The pretreated hydrocarbon feed stream 111 can be separated further based on molecular class into a predominantly saturate fraction 113 and a predominantly aromatics fraction 114 by means of a simulated (SMB) or conventional true moving bed (TMB) adsorption apparatus 112.

A SMB system can have several beds that, while fixed, alternate between an adsorption stage, a desorption stage, and optionally one or more purge stages. The ratio of beds operating in an adsorption stage can generally be equal to or less than the number of beds operating in a desorption or regeneration stage. In an embodiment, the ratio of beds in adsorption to desorption is between about 1:1 and 1:5, between about 1:1 and 1:4, between about 1:1 and 1:3, and between about 1:1 and 1:2. The SMB system can include a plurality of fixed sorbent beds, each sorbent bed including a sorbent, a first port at an end of the bed and a second port at an end of the bed distal to the first port; an adsorption stage and a desorption stage; and a series of valves and lines interconnecting each of the beds via the first and second ports. Examples of SMB systems are described in U.S. Pat. Nos. 2,985,589; 3,510,423; 3,686,342; and 5,750,820 and US Patent Application Publication No. 2008/036913, each of which is incorporated herein by reference. Those of ordinary skill in the art are familiar with the design and operation of an SMB system.

Any conventional moving bed system could be used in lieu of a SMB system, including a vertical flowing moving bed and a circulating moving bed systems. The present technological advancement could be implemented using a combination of SMB and TMB. However, SMB technology can be preferred when separating complex mixtures into two streams where each stream including components having similar adsorptive properties (i.e., accounting for differences in pressure/temperature and/or other operational parameters, similarity can be assessed based on a comparison of the molecules passing through a membrane). Conventionally, SMBs utilized a concentration-based displacement by using a heavier, high boiling solvent. The solvent is distributed into the extract and the raffinate stream which often requires two distillation processes in the backend to recover the solvent from the two product streams. The extract is the slow moving/more adsorptive part of the feed—aromatics in this case, while the raffinate is the faster moving/less adsorptive part of the feed—saturates in this case. The solvent can be selected from the solvent-range saturates stream 102 or solvent-range aromatics stream 118 recycled from the back-end membrane process, and/or any combination thereof, including conventional solvent streams.

The saturate fraction 113 comprising greater than 50 wt %, or 50 wt % to 95 wt %, or 60 wt % to 95 wt %, or 75 wt % to 95 wt % saturated hydrocarbons is then passed through a hydrocarbon reverse osmosis (HCRO) or organic solvent nanofiltration (OSN) membrane 115 to recover the solvent-range saturates stream 102 and an enriched saturates product stream 116. As illustrated, the solvent-range saturates stream 102 can be optionally be recycled back into the system 100 at a one or more of the hydrocarbon feed stream 101, the reactors 107, and the SMB/TMB 112.

The saturates product stream 116 can be further processed advantageously when compared to the hydrocarbon feed stream 101. The saturates product stream 116 can be very low in aromatics, particularly multi-ring aromatics and essentially free of heteroatom species, metal species, and asphaltenes. Downstream processing could include sending this entire stream (or any portion thereof) to a steam cracker to make olefins. Downstream processing could include low pressure hydroisomerization or hydrocracking to prepare low pour point lubes and distillates. Low heteroatom species concentrations could significantly improve catalyst performance in these downstream processes. The saturates product stream 116 could be flashed and the bottoms processed by hydrocracking or FCC, with the overhead treated similarly to above. The saturates product stream 116, if rich in naphthenes, can be sent to a naphtha reformer to preferentially make iso-paraffins and aromatics that can then be used as motor gasoline (iso-paraffins) or aromatics, which is then sent to the aromatics plant.

The solvent-range saturates stream 102, if rich in n-paraffins, can be sent to an isomerization process to preferentially make iso-paraffins which are sent to the motor gasoline pool.

The aromatics fraction 114 comprising greater than 50 wt %, or 50 wt % to 95 wt %, or 60 wt % to 95 wt %, or 75 wt % to 95 wt % aromatic hydrocarbons is then passed through a HCRO/OSN membrane 117 to recover the solvent-range aromatics stream 118 (e.g., typically $C_5$ to $C_{12}$ aromatic hydrocarbons) and an enriched aromatics product stream 119. As illustrated, the solvent-range aromatics stream 118 can be optionally be recycled back into the system 100 at a one or both of the reactors 107 and the SMB/TMB 112.

Mixing of the solvent-range saturates stream 102 and the solvent-range aromatics stream 118 can be done before introduction back into the SMB/TMB 112 to control the solvent strength and polarity used to effect separation.

The aromatic solvents can be sent to the aromatics or chemical plant to make a range of chemical products The aromatics product stream 119 can be further processed advantageously when compared to the hydrocarbon feed stream 101. The aromatics product stream 119 is very low in saturates and essentially free of heteroatom species, metal species, and asphaltenes. Downstream processing could include hydrocracking. Low heteroatom species concentrations could significantly improve catalyst performance. The aromatics product stream 119 could be flashed and the bottoms processed by FCC or a hydrocracker with the overhead going to chemicals processing.

While HCRO/OSN membranes are discussed in this example, other nanofiltration and/or ultrafiltration membranes can be used.

Accordingly, a molecular separation method of the present disclosure can comprise: passing a deasphalted oil stream (e.g., a deasphalted crude oil or any deasphalted fraction of crude oil) (e.g., permeate 105) through a reactor 107 containing an active substrate (e.g., catalytic active substrates 106, absorbent active but not catalytically active substrates, or a combination thereof), wherein the catalytic active substrate adsorbs heteroatom species from the deasphalted oil stream and produces a pretreated hydrocarbon feed stream 111 essentially free of 4+ ring aromatic molecules (ARC 4+ species), metal species, and heteroatom species; and chromatographically separating with a simulated moving bed apparatus or a true moving bed apparatus (e.g., SMB/TMB 112) the pretreated hydrocarbon feed stream 111 into a saturate fraction 113 and an aromatics fraction 114. Optionally said method can further comprise: separating a hydrocarbon feed stream 101 (e.g., a crude oil or any fraction of crude oil) into (a) a retentate stream 104 enriched, relative to the hydrocarbon feed stream 101, in one selected from the group consisting of 4+ ring aromatic molecules (ARC 4+ species), the metal species, the heteroatom species, and any combination thereof and (b) the deasphalted oil stream 105. Optionally, said method (with or without separating a hydrocarbon feed stream 101) can further comprise: separating the saturate fraction 113 with a membrane into a saturates product stream 116 and a solvent-range saturates stream 102 comprising C5 to C12 saturated hydrocarbons (which can optionally be recycled back to one or more of the hydrocarbon feed stream 101, the reactor 107, the SMB/TMB 112) and/or separating the aromatics fraction 114 with a membrane into an aromatics product stream 119 and a solvent-range aromatics stream 118 comprising C5 to C12 aromatic hydrocarbons (which can optionally be recycled back to one or more of the reactor 107 and the SMB/TMB 112). Optionally, said method (with or without separating a hydrocarbon feed stream 101, with or without separating the saturate fraction 113, and with or without separating the aromatics fraction 114) can further comprise: (i) halting the passing of the deasphalted oil stream through the reactor 107 and starting passing a hydrogen stream 108 and optionally the solvent-range saturates stream 102 and/or the solvent-range aromatics stream 118 through the reactor 107; heating the reactor 107; and hydrotreating or hydrocracking in the reactor 107 to produce an output stream 109 and/or (ii) halting the passing of the deasphalted oil stream through the reactor 107 and starting passing the solvent-range saturates stream 102 and/or the solvent-range aromatics stream 118 and optionally a hydrogen stream 108 through the reactor 107 to produce an output stream 109; and hydrotreating or hydrocracking the output stream 109.

Further, a separation system comprising: a reactor 107 fluidly configured to receive a deasphalted oil stream (e.g., a deasphalted crude oil or any deasphalted fraction of crude oil) (e.g., permeate 105), wherein the reactor 107 contains an active substrate (e.g., catalytic active substrates 106, absorbent active but not catalytically active substrates, or a combination thereof) that adsorbs heteroatom species from the deasphalted oil stream and produces a pretreated hydrocarbon feed stream essentially free of the ARC 4+ species, the metal species, and the heteroatom species; and a chromatographic separator 112 fluidly coupled to the reactor 107 and configured to receive the pretreated hydrocarbon feed stream 111 and produce a saturate fraction 113 and an aromatics fraction 114, wherein the chromatographic separator 112 is a simulated moving bed apparatus or a true moving bed apparatus (SMB/TMB). Optionally said system can further include: a first separator 103 configured to receive a hydrocarbon feed stream 101 (e.g., a crude oil or any fraction of crude oil) and separate the hydrocarbon feed stream 101 into (a) a retentate 104 stream enriched, relative to the hydrocarbon feed stream, in one selected from the group consisting of 4+ ring aromatic molecules (ARC 4+ species), metal species, heteroatom species, and any combination thereof and (b) the deasphalted oil stream 105. Optionally said system can further include (with or without the first separator): (i) a second separator 115 comprising a membrane and configured to receive the saturate fraction 113 from the SMB/TMB and produce a saturates product stream 116 and a solvent-range saturates stream 102 comprising C5 to C12 saturated hydrocarbons (where the system can optionally be configured to recycled the solvent-range saturates stream 102 back to one or more of the hydrocarbon feed stream 101, the reactor 107, the SMB/TMB 112); and/or (ii) a third separator 117 comprising a membrane and configured to receive the aromatics fraction 114 from the SMB/TMB and produce an aromatics product stream 119 and a solvent-range aromatics stream 118 comprising C5 to C12 saturated hydrocarbons (where the system can optionally be configured to recycle the solvent-range aromatics stream 118 back to one or more of the reactor 107 and the SMB/TMB 112).

Furthermore, system of FIG. 1 can be computer controlled, wherein a computer uses models to predict how much of the solvent saturates and/or the solvent aromatics that will be fed back to the various points. Although not illustrated, the computer system can be communicatively coupled to a variety of sensors (flow meter, pressure, temperature) disposed at locations that would provide data necessary for the execution of the model.

Example Embodiments

A first example embodiment is a molecular separation method comprising: passing a deasphalted oil stream (e.g., a deasphalted crude oil or any deasphalted fraction of crude oil) through a reactor containing an active substrate, wherein the catalytic active substrate adsorbs heteroatom species from the deasphalted oil stream and produces a pretreated hydrocarbon feed stream essentially free of 4+ ring aromatic molecules (ARC 4+ species), metal species, and heteroatom species; and chromatographically separating with a simulated moving bed apparatus or a true moving bed apparatus (SMB/TMB) the pretreated hydrocarbon feed stream into a saturate fraction and an aromatics fraction. Optionally said method can include one or more of the following: Element 1: the method further comprising: separating a hydrocarbon feed stream (e.g., a crude oil or any fraction of crude oil) into (a) a retentate stream enriched, relative to the hydrocarbon feed stream, in one selected from the group consisting of 4+ ring aromatic molecules (ARC 4+ species), the metal species, the heteroatom species, and any combination thereof and (b) the deasphalted oil stream; Element 2: Element 1 and wherein separating the hydrocarbon feed stream comprises passing the hydrocarbon feed stream through an ultrafiltration membrane; Element 3: Element 1 and wherein separating the hydrocarbon feed stream comprises passing the hydrocarbon feed stream through a desasphalter; Element 4: the method further comprising: mixing the hydrocarbon feed stream with a solvent-range saturates stream comprising C5 to C12 saturated hydrocarbons; Element 5: Element 1 and the method further comprising: supplying the retentate stream to a coker, visbreaker, or a deasphalter; Element 6: the method further comprising: separating the saturate fraction with a membrane into a saturates product stream and a solvent-range saturates stream comprising C5 to C12 saturated hydrocarbons; Element 7: Element 6 and the method further comprising: supplying the solvent-range saturates stream to one selected from the group consisting of the hydrocarbon feed stream, the reactor, the SMB/TMB, and any combination thereof; Element 8: Element 6 and the method further comprising: halting the passing of the deasphalted oil stream through the reactor and starting passing the solvent-range saturates stream and optionally a hydrogen stream through the reactor to produce an output stream; and hydrotreating or hydrocracking the output stream; Element 9: the method further comprising: separating the aromatics fraction with a membrane into an aromatics product stream and a solvent-range aromatics stream comprising C5 to C12 aromatic hydrocarbons; Element 10: Element 9 and the method further comprising: supplying the solvent-range aromatics stream to one selected from the group consisting of the reactor, the SMB/TMB, and any combination thereof; Element 11: Element 9 and the method further comprising: halting the passing of the deasphalted oil stream through the reactor and starting passing the solvent-range aromatics stream and optionally a hydrogen stream through the reactor to produce an output stream; and hydrotreating or hydrocracking the output stream; Element 12: wherein the active substrate comprises a catalytically active substrate; Element 13: Element 12 and halting the passing of the deasphalted oil stream through the reactor and starting passing a hydrogen stream and optionally the solvent-range saturates stream and/or the solvent-range aromatics stream through the reactor; heating the reactor; and hydrotreating or hydrocracking in the reactor to produce an output stream; and Element 14: wherein the membrane for separating the hydrocarbon feed stream, the membrane for separating the saturate fraction, and/or the membrane for separating the aromatics fraction is a hydrocarbon reverse osmosis membrane, a nanofiltration membrane, or an ultrafiltration membrane. Examples of combinations can include, but are not limited to, Element 1 (optionally in combination with one or more of Elements 2, 3, 5) in combination with one or more of Elements 4, 6-14; Element 4 in combination with one or more of Elements 6-14; Element 6 (optionally in combination with one or both of Elements 7 and 8) in combination with one or more of Elements 9-12, 14; Element 9 (optionally in combination with one or both of Elements 10 and 11) in combination with one or more of Elements 12 and 14; and Element 12 (and optionally Element 13) in combination with Element 14.

A second example embodiment is a separation system comprising: a reactor fluidly configured to receive a deasphalted oil stream (e.g., a deasphalted crude oil or any deasphalted fraction of crude oil), wherein the reactor contains a catalytic active substrate that adsorbs heteroatom species from the deasphalted oil stream and produces a pretreated hydrocarbon feed stream essentially free of the ARC 4+ species, the metal species, and the heteroatom species; and a chromatographic separator fluidly coupled to the reactor and configured to receive the pretreated hydrocarbon feed stream and produce a saturate fraction and an aromatics fraction, wherein the chromatographic separator is a simulated moving bed apparatus or a true moving bed apparatus (SMB/TMB). Optionally said system can include one or more of the following: Element 14: the system further comprising: a first separator configured to receive a hydrocarbon feed stream (e.g., a crude oil or any fraction of crude oil) and separate the hydrocarbon feed stream into (a) a retentate stream enriched, relative to the hydrocarbon feed stream, in one selected from the group consisting of 4+ ring aromatic molecules (ARC 4+ species), metal species, heteroatom species, and any combination thereof and (b) the deasphalted oil stream; Element 15: Element 14 and wherein the first separator comprises an ultrafiltration membrane; Element 16: Element 14 and wherein the first separator comprises a deasphalter; Element 17: Element 14 and the system further comprising: a coker, visbreaker, or a deasphalter fluidly coupled to the first separator and configured to receive the retentate stream from the first separator; Element 18: the system further comprising: (i) a second separator comprising a membrane and configured to receive the saturate fraction from the SMB/TMB and produce a saturates product stream and a solvent-range saturates stream comprising C5 to C12 saturated hydrocarbons; and/or (ii) a third separator comprising a membrane and configured to receive the aromatics fraction from the SMB/TMB and produce an aromatics product stream and a solvent-range aromatics stream comprising C5 to C12 saturated hydrocarbons; Element 19: Element 18 and wherein the reactor is configured to receive the solvent-range saturates stream and/or the solvent-range aromatics stream; Element 20: Element 18 and wherein the SMB/TMB is configured to receive the solvent-range saturates stream and/or the solvent-range aromatics stream; and Element 21: wherein the reactor is configured to receive a hydrogen stream and to be heated to a temperature sufficient to conduct a hydrotreating or hydrocracking reaction. Examples of combinations can include, but are not limited to, Element 14 (optionally in combination with one or more of Elements 15-17) in combination with one or more of Elements 18-21; and Element 18 (optionally in combination with one or more of Elements 19-20) in combination Element 21.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Example 1—Removal of Metal Species, Asphaltenes, Heteroatom Species in Whole Crude by Ultrafiltration A sample of Eagle Ford (EF) whole crude was separated using ceramic membranes having pore size distribution centered at 2 nm at a temperature of 100° C. and a transmembrane pressure of 400 psig. The Eagle Ford sample was run through the membrane to produce a 90% permeate yield by weight on feed. In all of the examples below, elemental analysis (Ca, Fe, Na, Ni, Va, and Zn) was measured via inductively coupled plasma (ICP) mass spectroscopy. The results are depicted in Table 1 below.

TABLE 1

| Description | EF - Feed | EF - Permeate | % Reduction |
|---|---|---|---|
| API Density | 42.4 | | |
| Calcium (ppm) | 13.2 | 1.52 | 88.5 |
| Iron (ppm) | 14.2 | 1.52 | 89.3 |
| Sodium (ppm) | 32.1 | 10.6 | 67.0 |
| Nickel (ppm) | 1.30 | 0.38 | 70.8 |
| Vanadium (ppm) | 8.79 | 1.6 | 81.8 |
| Zinc (ppm) | 5.17 | 0.22 | 95.7 |
| MCR (%) | 1.20 | 0.20 | 83.3 |

It can be seen that not only is micro carbon rejected from the Eagle Ford shale oil, but the membrane also rejects the majority of inorganic species in the whole crude. The sample was not desalted prior to membrane testing.

A sample of Maya crude was separated using an 8 kD ceramic membrane at a temperature of 200° C. and transmembrane pressure of 600 psig. The Maya sample was run through the membrane to produce a 50% permeate yield by weight on feed. Sulfur was determined via ASTM 2622-16. The results are depicted in Table 2 below.

TABLE 2

| Description | Maya - Feed | Maya - Permeate | % Reduction |
|---|---|---|---|
| API Density | 21.5 | | |
| Sulfur (wt %) | 3.72 | 2.44 | 34.4 |
| Nickel (ppm) | 60 | 13 | 78.3 |
| Vanadium (ppm) | 302 | 38 | 87.4 |
| MCR (%) | 12.5 | 2.55 | 79.6 |

It can be seen that not only is micro carbon rejected from the Maya crude oil, but the membrane also rejects a significant amount of inorganic species such as sulfur, nickel, and vanadium. The sample was not desalted prior to membrane testing.

Samples of Arab Light crude (API gravity of about 32.8) were separated using various membranes at different temperatures. The Arab Light samples were run through the membranes to produce a 75% permeate yield by weight on feed. The results are depicted in Table 3 below.

TABLE 3

| Conditions | Streams | MCR (%) | Sulfur (wt %) | Ni (ppm) | V (ppm) |
|---|---|---|---|---|---|
| Arab Light, Evonik Selective, 100° C., 600 psig | Feed | 4.495 | 1.8 | 6 | 15 |
| | Permeate | 0.521 | 1.279 | 2.143 | 1.224 |
| | % Reduction | 88.4 | 28.9 | 64.3 | 91.8 |
| Arab Light, Evonik Flux, 100° C., 600 psig | Feed | 4.495 | 1.8 | 6 | 15 |
| | Permeate | 0.686 | 1.383 | 0.641 | 0.897 |
| | % Reduction | 84.7 | 23.2 | 89.3 | 94.0 |
| Arab Light, Evonik 600, 100° C., 600 psig | Feed | 4.495 | 1.9925 | 6 | 15 |
| | Permeate | 0.536 | 1.398 | 1.065 | 1.935 |
| | % Reduction | 88.1 | 29.8 | 82.3 | 87.1 |
| Arab Light, Evonik Flux, 75° C., 600 psig | Feed | 4.495 | 1.9925 | 6 | 15 |
| | Permeate | 0.495 | 1.413 | 0.796 | 1.032 |
| | % Reduction | 89.0 | 29.1 | 86.7 | 93.2 |
| Arab Light, Evonik Performance, 75° C., 600 psig | Feed | 4.495 | 1.9925 | 6 | 15 |
| | Permeate | 0.422 | 1.508 | 0.779 | 1.948 |
| | % Reduction | 90.6 | 24.3 | 87.0 | 87.0 |
| Arab Light, 8 kD ceramic, 100° C., 600 psig | Feed | 4.55 | 1.9925 | 9.2 | 20.4 |
| | Permeate | 0.408 | 1.391 | 2.389 | 0.885 |
| | % Reduction | 91.0 | 30.2 | 74.0 | 95.7 |

It can be seen that not only is micro carbon rejected from the Arab Light oil, but the membranes also rejects significant amounts of inorganic species in the whole crude such as sulfur, nickel, and vanadium. The percent rejection remains fairly constant across different temperatures and using different commercially available membranes. The samples were not desalted prior to membrane testing.

Figure 2:
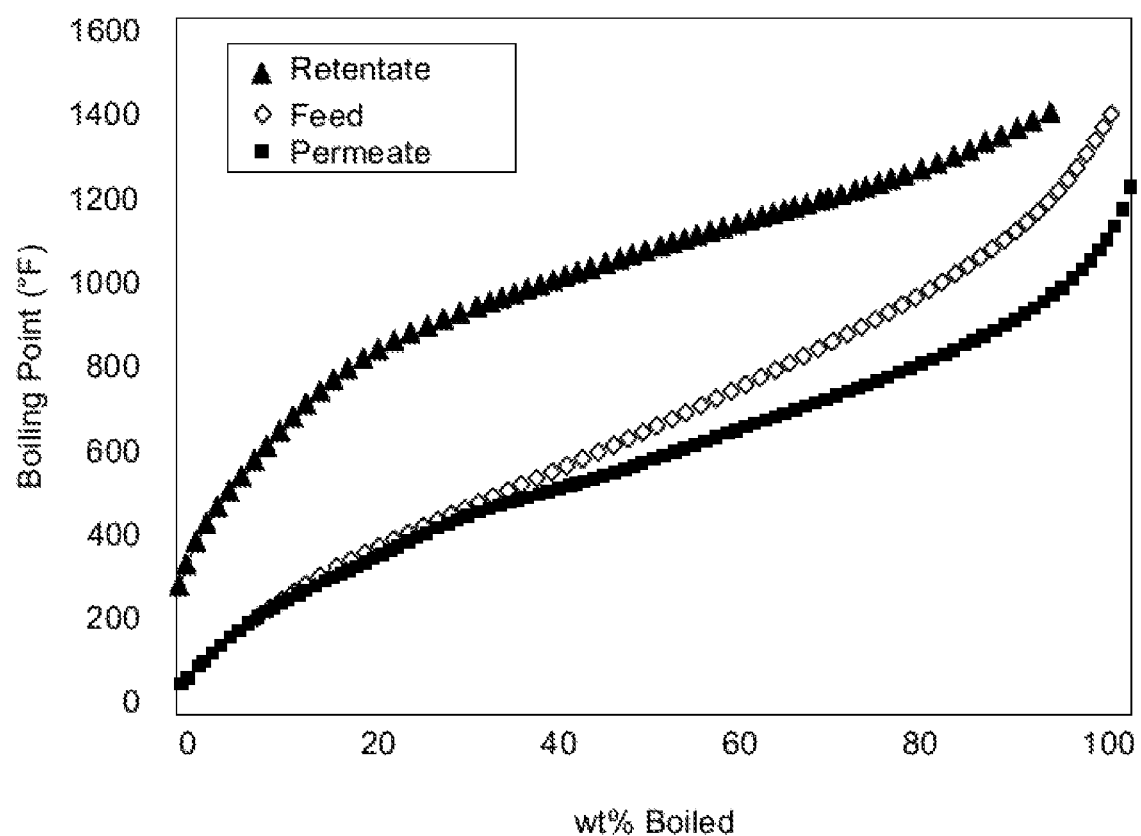
FIG. 2 shows the simulated distillation curves for an Arab Light crude oil separated with a ceramic membrane.

In addition to inorganic species and MCR reduction, the membrane separations described herein also perform a boiling point separation without vaporizing any of the species in the crude oil. FIG. 2 shows the simulated distillation curves for an Arab Light crude oil separated with a ceramic membrane having a 2 nm average pore size distribution at 150° C. and 600 psig transmembrane pressure. This run was again taken to 75% permeate yield on feed. The membrane separation achieves around a 600° F. (316° C.) boiling point separation between permeate and retentate.

Example 2—Adsorption of Sulfur and Reactive Regeneration

A commercial nickel-molybdenum hydrotreating catalyst, Haldor-Topsoe TK-563, was used to adsorb sulfur from a model feed, followed by hydrotreating. In this example, a 1% w/w solution of dibenzothiophene (DBT) in n-heptane was adsorbed on a column of activated and sulfided TK-563 catalyst until breakthrough of the DBT.

The column contained 2.63 g/4.15 ml of TK-563 sized to 30-60 mesh and activated at 150° C. in nitrogen. The 1% DBT solution was passed through the column at 1.0 ml/min (14.3 LHSV hr$^{-1}$) (LHSV=liquid hourly space velocity) for 30 minutes to load the adsorbent with DBT. The DBT breakthrough curve was used to monitor the capacity of the catalyst through multiple adsorption-regeneration cycles.

Regeneration of the catalyst was achieved by first purging interstitial liquid from the column, pressuring with hydrogen to 5500 kPag (800 psig), and locking in with a back pressure regulator at 6000 kPag. The column temperature was increased to 350° C. and held at temperature for 1 hour and then cooled to less than 150° C. before depressurizing. It may be preferred to cool as fast as possible in order to minimize additional conversion and avoid losses. There was no hydrogen flowing during the regeneration, so that the primary reaction products would remain on the catalytic adsorbent when cooled and depressurized to vent excess hydrogen and hydrogen sulfide ($H_2S$). A dry ice (DI) trap was used to collect any light hydrocarbons or components that were not retained in the column.

Figure 3:
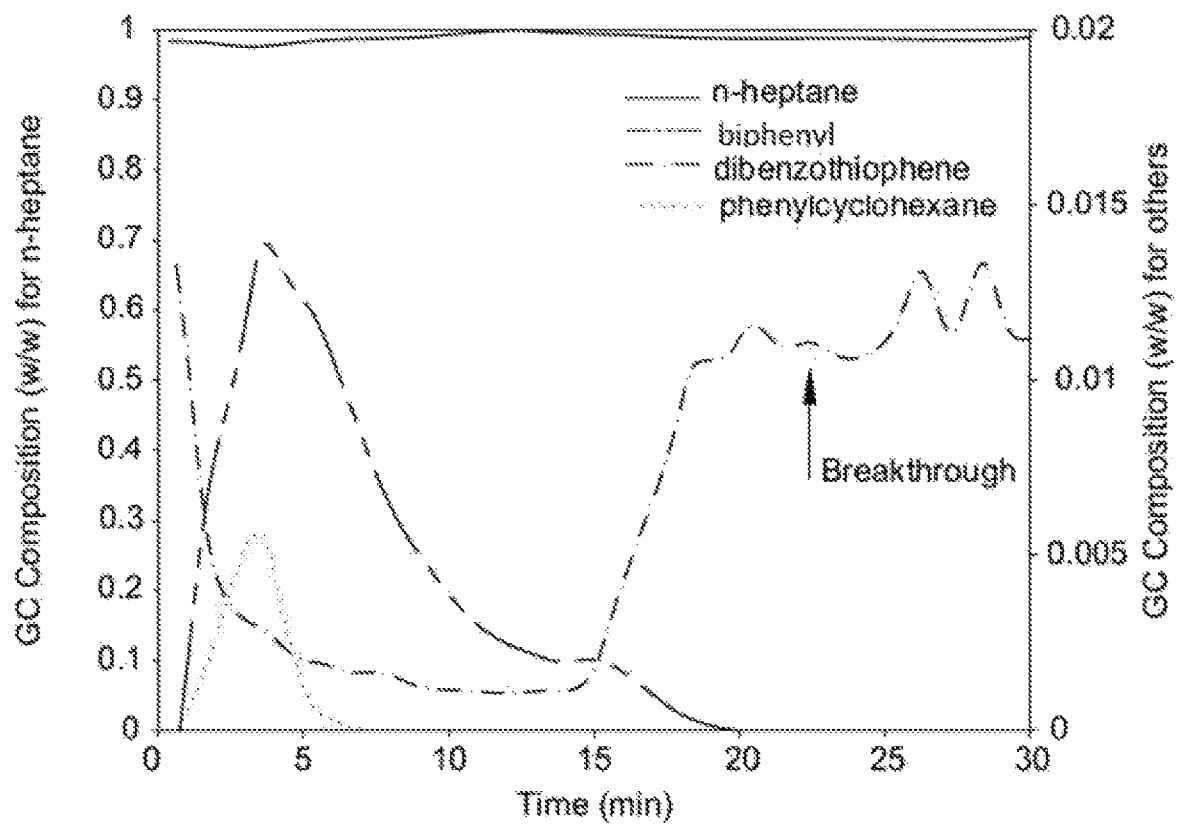
FIG. 3 illustrates gas chromatograph data of the eluent of from a column illustrating the displacement and loading process.

Following hydrogen regeneration of the catalytic adsorbent, the composition of the reaction products and reloading of the column was achieved by displacement and adsorption using the 1% DBT in n-heptane solution as noted above. A fraction collector was used to periodically sample the eluent allowing reconstruction of the displacement and loading process. FIG. 3 illustrates a typical result. Nearly all of the DBT (98%) was consistently converted at the conditions noted above. A portion of the DBT remaining may have been displaced to the ends of the column during the regeneration process, and as such may not have been in contact with the catalyst. Biphenyl (BP) and phenylcyclohexane/cyclohexylbenzene (PCH/CHB) were the primary reaction products, as expected and were displaced from the column during DBT loading. A calculated material balance for the 11$^{th}$ cycle is shown in Table 4.

Example 2 clearly illustrates that catalytic adsorbents can be effective at removing sulfur-containing species, and by analogy other heteroatom species such as nitrogen-containing species, from crude oils. The hydrotreating conditions and nature of the catalytic adsorbent would need to be optimized based on the feed composition to be processed. In this example, the n-heptane solvent for the DBT simulates crude oil or other hydrocarbon feeds. Benzothiophenes are typical of the aromatic sulfur compounds found in crude oil. DBT and methyl substituted DBT's are typically found in kerosenes and light gas oils. In actual use, the adsorption process would be stopped prior to breakthrough of the DBT or other heteroatom species. The displaced hydrocarbons from the reactive regeneration can be combined with the treated feed resulting from the adsorptive separation process for subsequent separation of saturates from aromatics (e.g., as illustrated in FIG. 1).

Example 3—Adsorptive Separation of Saturates and Aromatics

It is well known to those of ordinary skilled in the art that silica gels can separate saturates from aromatics (Mair, B. J., et al., Separation of Petroleum Hydrocarbons with Silica Gel, Research Paper RP809, Journal of Research of the National Bureau of Standards, Vol. 15, July 1935, pp 52-62). Many methods have evolved over the years, but they generally require solvent gradients to effect the separation, which is typically carried out at ambient temperature. Modern analytical methods use multiple columns and solvents to separate crude oils for further analysis (e.g., U.S. Patent Publication 2010/0218585).

Example 3 illustrates that the separation of saturates from aromatics on silica gel at elevated temperatures using a single non-polar solvent. A commercially available silica gel, DAVISIL® 923 (available from SigmaAldrich) having a particle size of 100-200 mesh, a surface area of 480 m$^2$/g, and a nominal pore size of 30 angstrom, was loaded into a 4.6 mm ID×250 mm long high performance liquid chroma-

TABLE 4

Material Balance ($H_2S$ and $H_2$ Calculated on Product)

| mmol/g Ads | DBT | BP | CHB/PCH | $H_2S$ | $H_2$ charged to the reactor (remaining or consumed) |
|---|---|---|---|---|---|
| DBT Adsorbed | 0.318 | 0.000 | 0.000 | 0.000 | 1.293 |
| LC Product (hydrocarbon displaced/recovered by desorption in liquid chromatography (LC)) | 0.005 | 0.266 | 0.026 | 0.292 | 0.000 |
| Trap Product | 0.001 | 0.001 | 0.000 | 0.001 | −0.002 |
| Total Product | 0.006 | 0.267 | 0.026 | 0.293 | −0.662 |
| $H_2$ Delta | | | | | 0.630 |
| DBT Converted | 0.312 | | | | |
| MB (calculated material balance - total recovered/feed as % wt) | 94.0% | | | | |
| DBT Conversion | 98.1% | | | | |

In this manner, thirteen cycles of adsorption and regeneration were performed. Several cycles were required to fully sulfide the catalyst. After 6 cycles, the hydrotreated production composition remained nearly constant. Greater than 83% of the initial adsorption capacity was recovered through all cycles, with the last cycle at 87% (0.27 mmol/g DBT).

tography (HPLC) column with a volume of 4.15 ml. After drying at 150° C. in nitrogen, the adsorbent weight was 3.15 g. Separations were carried out using cyclohexane (CYC) solvent at a 1.0 ml/min flow rate and temperatures from 25° C. to 150° C. at pressures in excess of 10 Bar. The column was contained in a temperature programmable oven containing a capillary preheat coil to ensure uniform temperatures during separation. Fractions were collected periodically and analyzed by gas chromatography allowing quantitative reconstruction of the liquid phase adsorptive separation. Simple model feed mixtures were prepared to simulate the molecular types found in crude oil.

Figure 4:
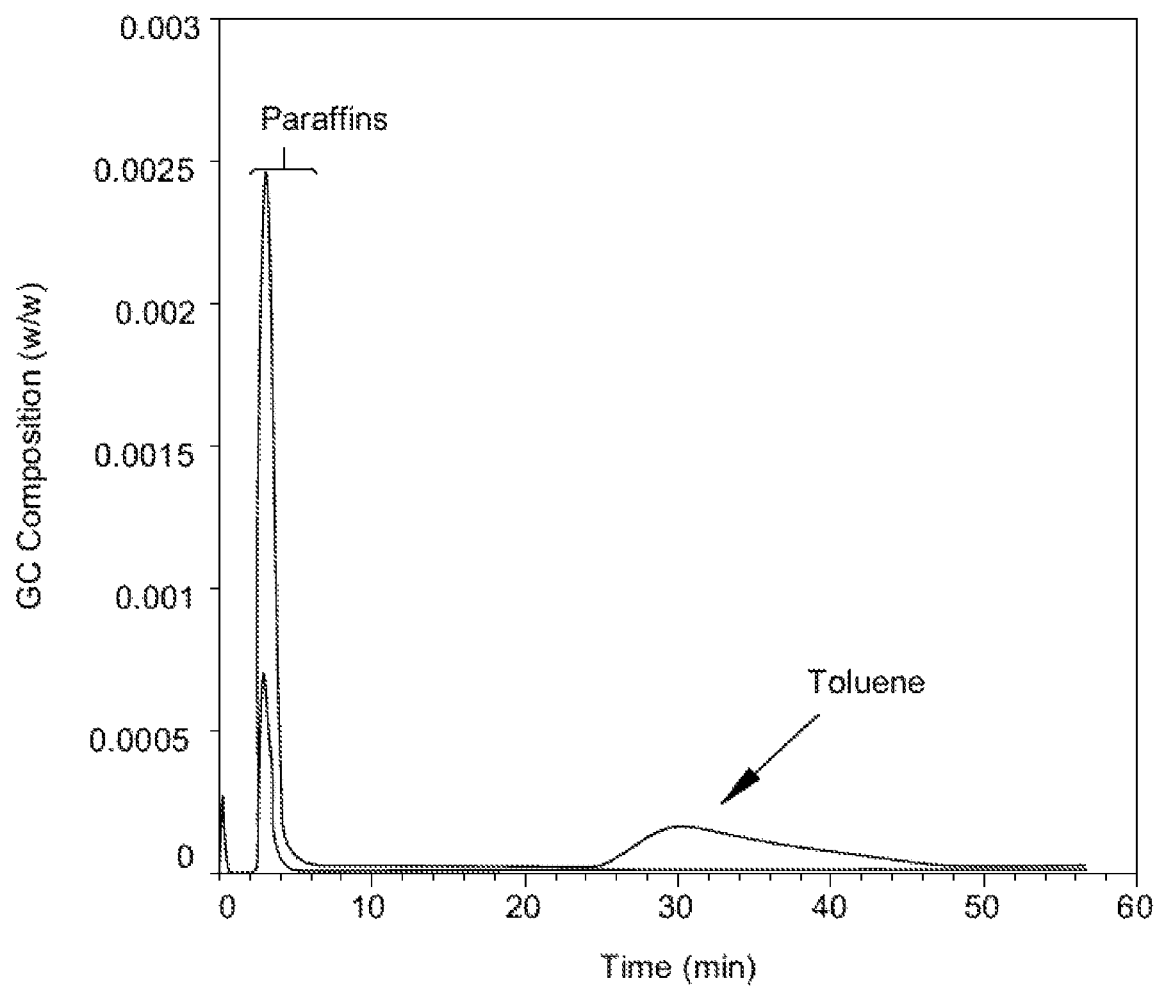
FIGS. 4 and 5 illustrate gas chromatograph results obtained using the adsorbent column as described in Example 3.

FIG. 4 illustrates the separation of toluene from a mixture of n-paraffins at 25° C. using a 50 microliter pulse of sample. Under these conditions, all of the paraffins from n-pentane to n-hexadecane in the mixture co-elute, indicative of weak adsorption. Toluene is separated completely, but shows a long tail indicative of strong adsorption and the need for more polar solvents in traditional separations. In conventional chromatographic separations conducted at temperatures from ambient to about 60° C., a solvent gradient is used, with non-polar solvents such as n-hexane used to elute saturates, and solvents such as toluene or even methanol used to elute aromatics.

Figure 5:
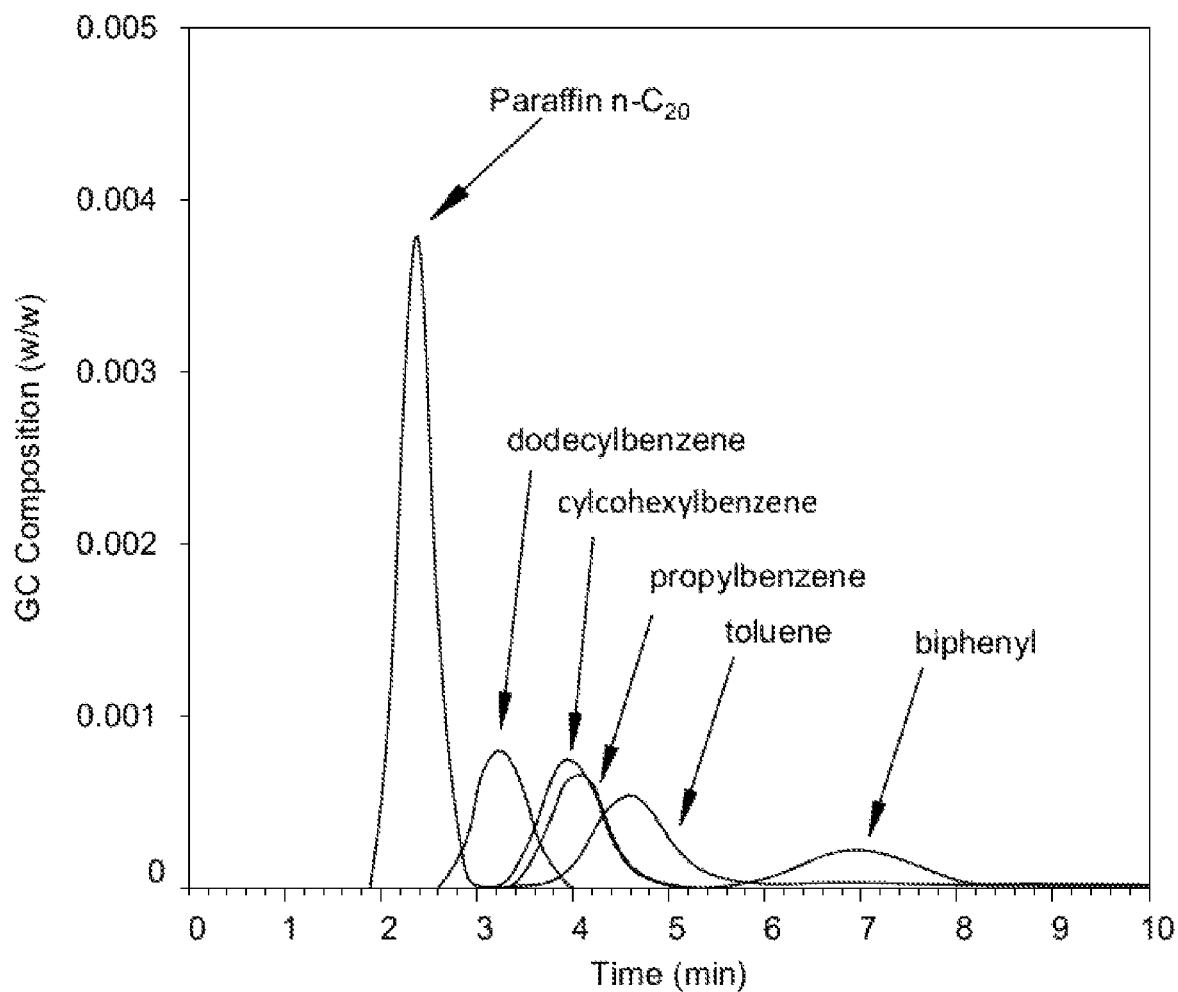

FIG. 5 illustrates the impact of increasing the separation temperature well beyond the conditions typically used. At 150° C. (although applications may have temperatures ranging from 25° C. to 300° C., or 50° C. to 250° C., or 100° C. to 200° C.), aromatic toluene is well separated from paraffin n-C20 in the mixture using the silica gel column and non-polar cyclohexane solvent. The peak shape for the toluene is considerably more symmetrical and indicative of moderate adsorption at these conditions. This example also shows that the separation varies with aromaticity. For example, n-dodecylbenzene (C12B) elutes after n-C20, but before n-propylbenzene (C3B) and cyclohexylbenzene (CHB). Multiring aromatics are more strongly adsorbed, but retain symmetrical peak shape as illustrated by the elution of biphenyl (BP). Similar results have been obtained with higher molecular weight aromatics, including methylnaphthalene (2-ring), phenanthrene (3-ring), and pyrene (4-ring).

Discovering an ability to use a single solvent system to completely elute a complex mixture from adsorbents in a predictable manner is important to the development of continuous separation schemes, such as the SMB system.

Example 4—Isotherms for Silica Gel from Breakthrough Experiments

Figure 6A:
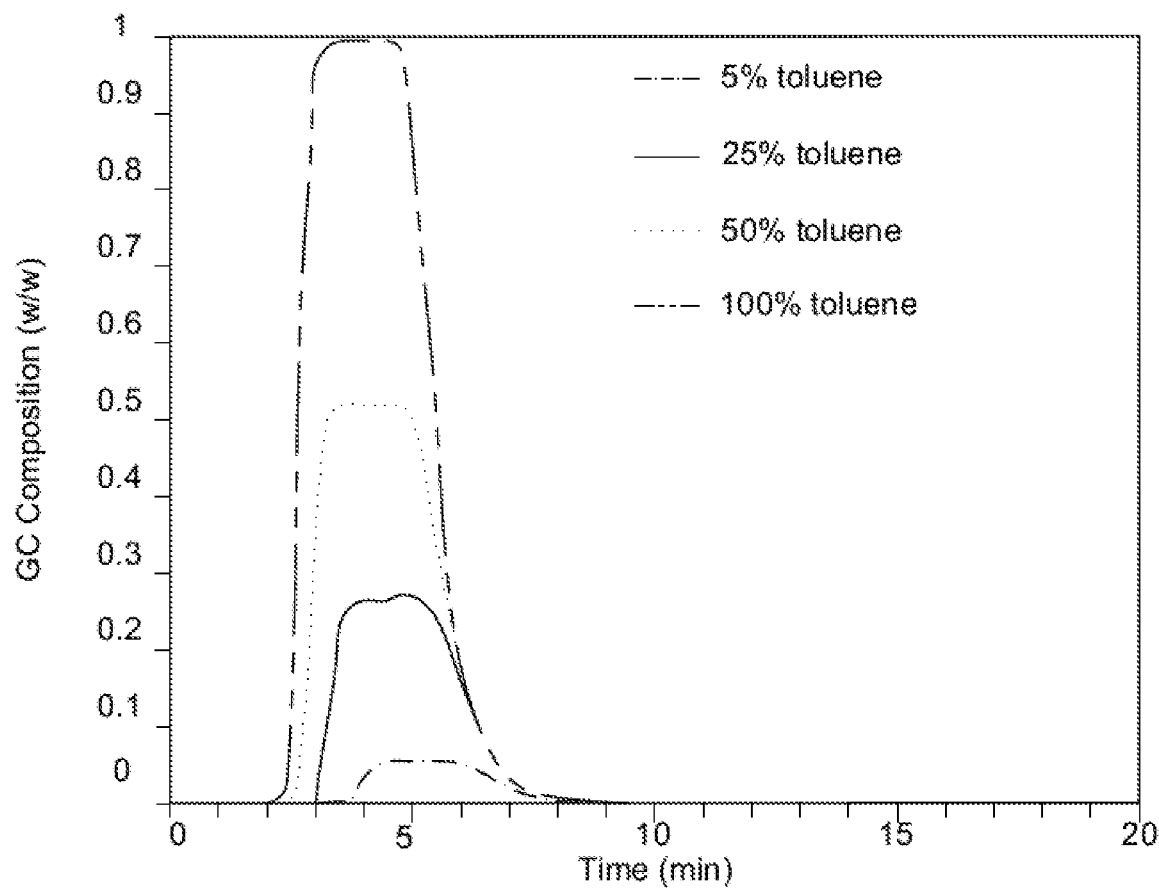
FIGS. 6A-6C illustrate breakthrough curves and the resulting isotherms for n-dodecane (nC12) and toluene using cyclohexane (CyC6) solvent.
Figure 6B:
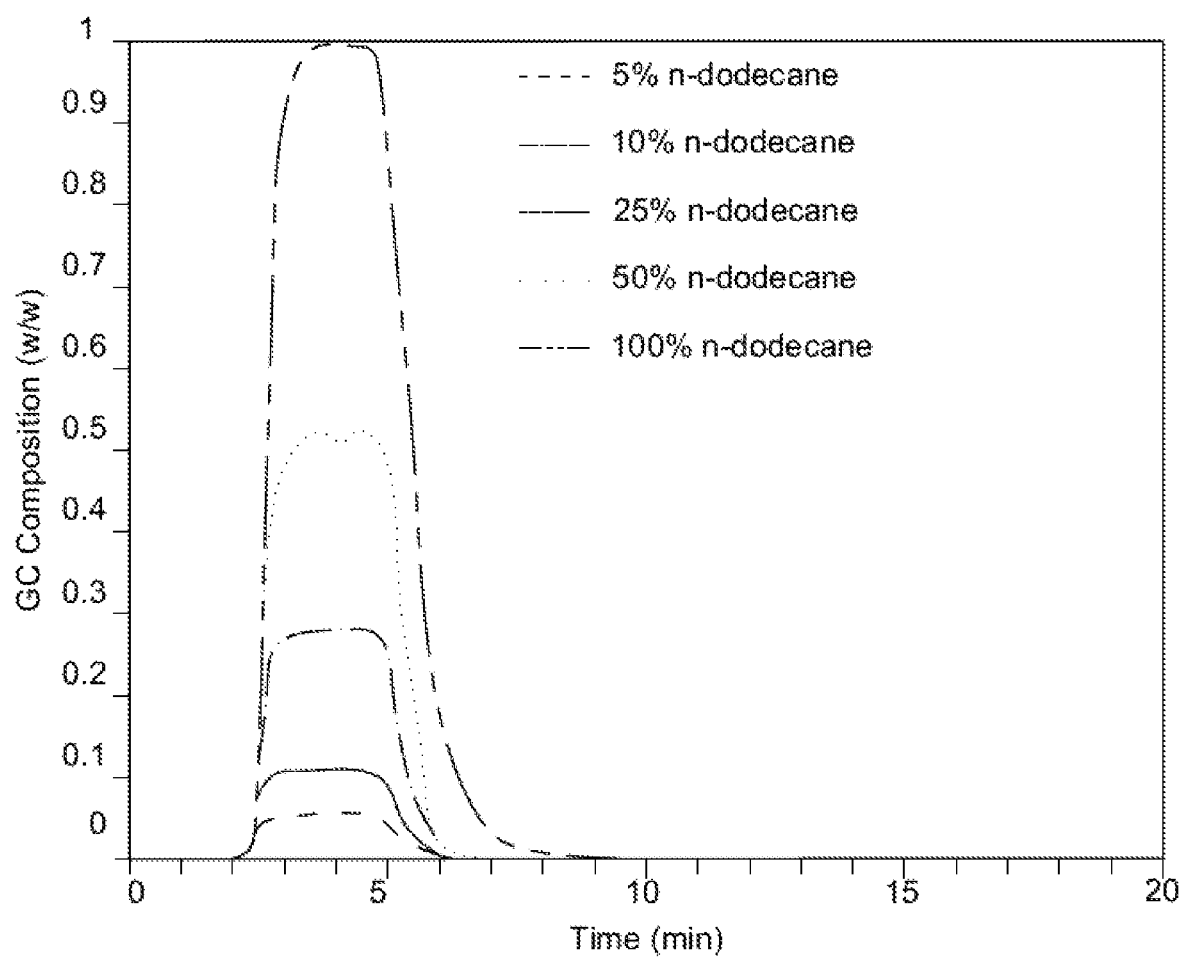
Figure 6C:
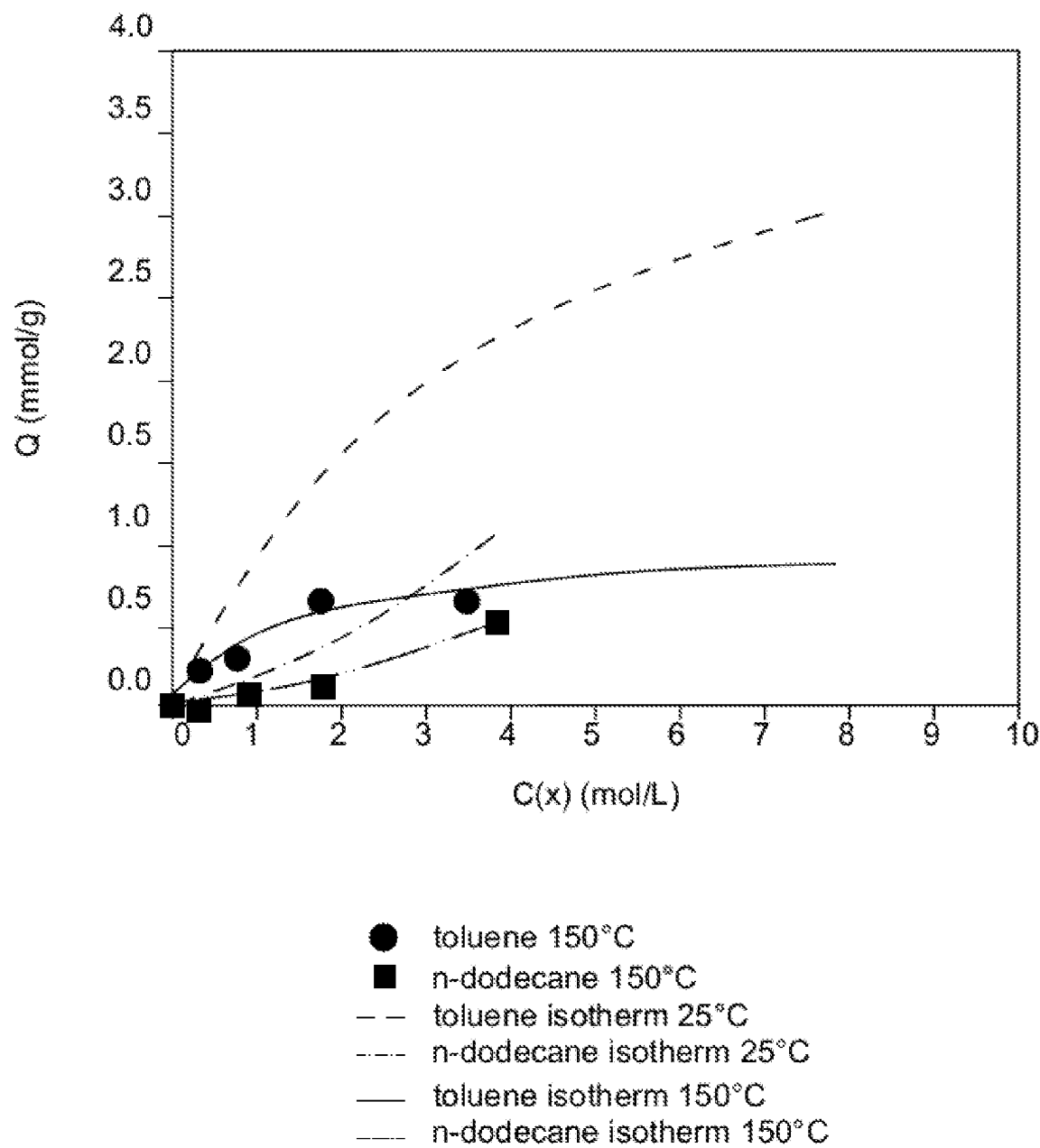

Isotherms were obtained for n-dodecane and toluene using analysis of breakthrough curves to saturation at various feed compositions. FIGS. 6A-6C illustrates results obtained using the same adsorbent column as described in Example 3. The results shown in FIGS. 6A and 6B were obtained at 150° C. using cyclohexane solvent for various concentrations of cyclohexane and n-dodecane, respectively. Toluene is more strongly adsorbed over the entire concentration range (from 5% to 100% v/v) illustrated and exhibits typical Langmuir behavior. n-dodecane is much more weakly adsorbed compared with toluene, but competitively adsorbed in cyclohexane at higher concentrations. FIG. 6C are the isotherms for toluene and n-dodecane at 25° C. and 150° C.

Analogous isotherms were obtained for other adsorbents and components using a less competitive solvent, isooctane. These isotherms provide support for constructing models for both conventional and chromatographic separations and SMB systems (see, the following discussion of Example 6).

Example 5—A Mesoporous Organo Silicate (MOS) Adsorbent

MOS material EMA-2 was prepared and evaluated for separation of saturates and aromatics. Following is a summary of the synthesis using $[(EtO)_2SiCH_2]_3$ in basic aqueous medium without surfactant.

A solution with 31.08 g of 30% $NH_4OH$ and 39.9 g of deionized water (DI) was made first. The pH of the solution was 12.55. 20.0 g of 1,2,3,3,5,5-hexaethoxy-1,3,5-trisilacyclohexane ($[(EtO)_2SiCH_2]_3$) was added to the solution, producing a mixture having the molar composition: 4.0 $[(EtO)_2SiCH_2]_3$:21OH:270$H_2O$, the mixture being stirred for 1 day at room temperature (20° C. to 25° C.). The formed soft gel was transferred to an autoclave and aged at 90° C. for 1 day. The gel was dried at 120° C. in a vacuum for 1 day to remove all the water and by product. This produced 3-ring MOS product, which was converted to white powder after grinding. The above preparation was repeated for two more time, and the total yield of the 3-ring MOS was 28.7 grams.

This MOS adsorbent was characterized as having 3.21 nm pore size, a pore volume of 1.02 $cm^3/g$, and 1267 $m^2$ surface area by $N_2$ B.E.T. (Brunauer-Emmett-Teller). Helium Pcynometry gave a skeletal density of 1.56 $g/cm^3$.

Example 6—Multi-Component Model Feed Separation Using MOS Adsorbent

The MOS adsorbent described in Example 5 was pelleted and sized to 100-200 mesh and packed into a 4.6 mm ID (internal diameter)×100 mm long 316SS HPLC column fitted with 0.5 micron frits having a volume of 1.66 $cm^3$. After drying at 150° C. in 100 cc/min dry nitrogen flow, the adsorbent weight was 0.66 g leading to packing density of 0.40 $g/cm^3$.

A multicomponent feed blend was prepared containing a mixture of paraffins, cycloparaffins, akylbenzenes, and multiring aromatics. The composition of this feed blend is described in Table 5.

TABLE 5

| Composition | wt % | vol % | mol % |
| --- | --- | --- | --- |
| n-heptane | 7.0% | 9.0% | 9.1% |
| n-dodecane | 19.6% | 21.5% | 14.9% |
| cyclohexane | 16.1% | 17.8% | 24.8% |
| n-dodecylbenzene | 25.0% | 23.3% | 13.1% |
| toluene | 18.5% | 18.1% | 26.0% |
| 1-methylnaphthalene | 13.4% | 10.4% | 12.1% |

This feed blend was separated using the MOS adsorbent at 150° C. using Isooctane (2,2,4-trimethylpentane) as a non-competitive solvent at a flow rate of 0.4 ml/min. A 3 ml sample of the feed mixture was introduced on the column from a sample loop. This sample size is large enough to saturate the adsorbent. Fractions were collected periodically to allow quantitative reconstruction of the separation following analysis by GC.

Figure 7:
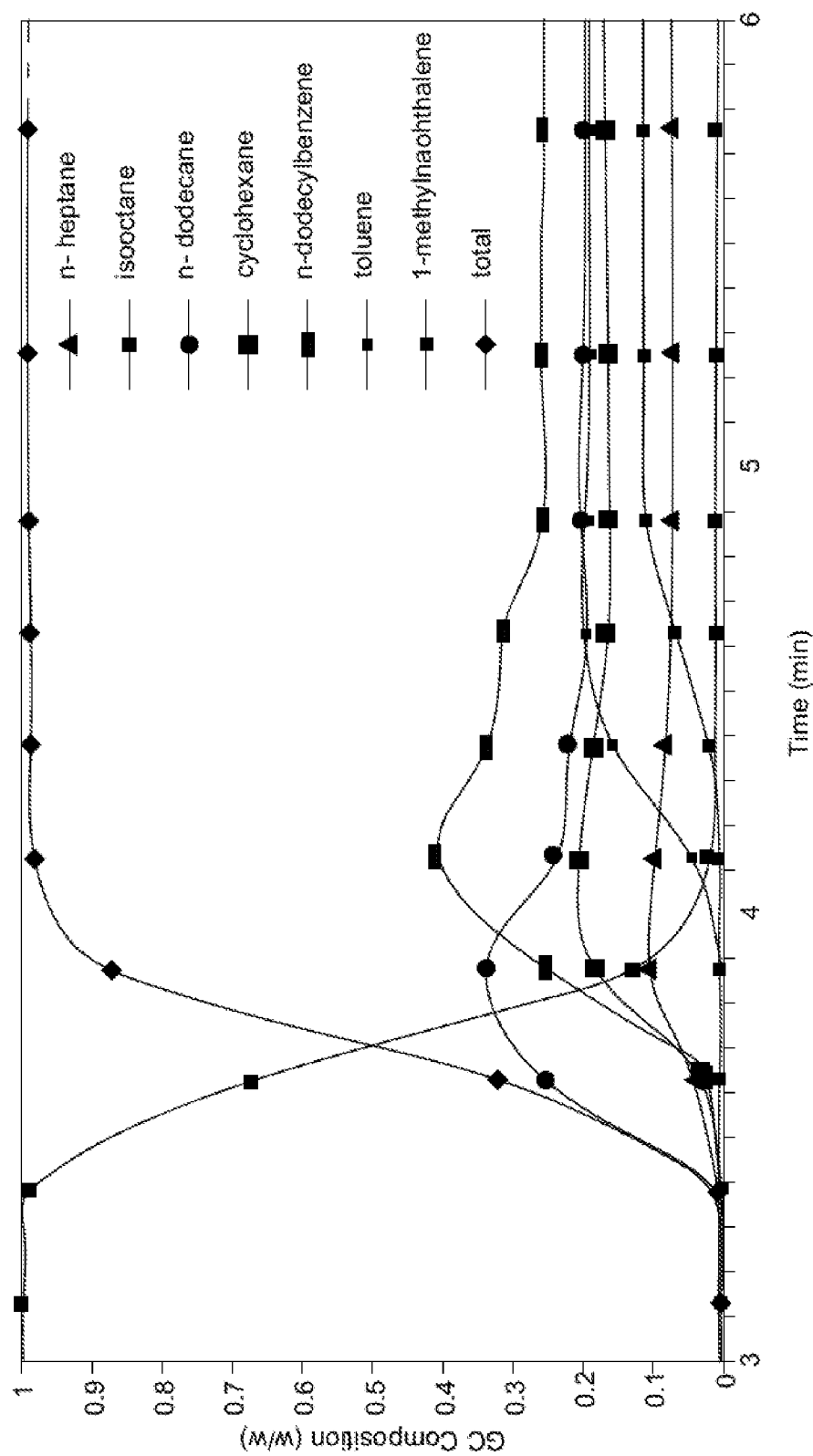
FIG. 7 illustrates exemplary mixture separation using mesoporous organo silicate.

FIG. 7 shows the separation front obtained. The MOS adsorbent separation order is very similar to that obtained with silica gel in earlier experiments, while using considerably less material. n-dodecane elutes first, followed by n-heptane, cyclohexane and n-dodecylbenzene. These all show substantial rollup when displaced by the more strongly adsorbed aromatic components in the feed. Toluene follows and is in turn displaced by the most strongly adsorbed component, 1-methylnaphthalene.

Isotherms were obtained for each of the components in isooctane at 150° C. using the MOS column. Application of a chromatographic model provided good agreement with the experimental results. The rollups obtained with the initial model analysis were not as distinct as noted experimentally, suggesting that some tuning (e.g., adjusting mass transfer resistances used in the model; tuning could include adjustments to the isotherms to account for competitive adsorption behavior over a wider range of concentrations than measured) is required.

Example 7—Simulated Moving Bed (SMB)

An SMB model was used to establish conditions for separation of the multicomponent model feed mixture described in Example 6 into predominantly saturates and aromatics streams.

As noted above, isotherms obtained experimentally by breakthrough chromatographic analysis of individual model feeds were used with a SMB process model to calculate the potential separation of saturates and aromatics from a multicomponent model feed.

The adsorbent properties used in the model were based on a mesoporous organo-silicate adsorbent having 3.21 nm pore size a pore volume of 1.02 cm$^3$/g and 1276 m$^2$ surface area by N$_2$ B.E.T.

Figure 8:
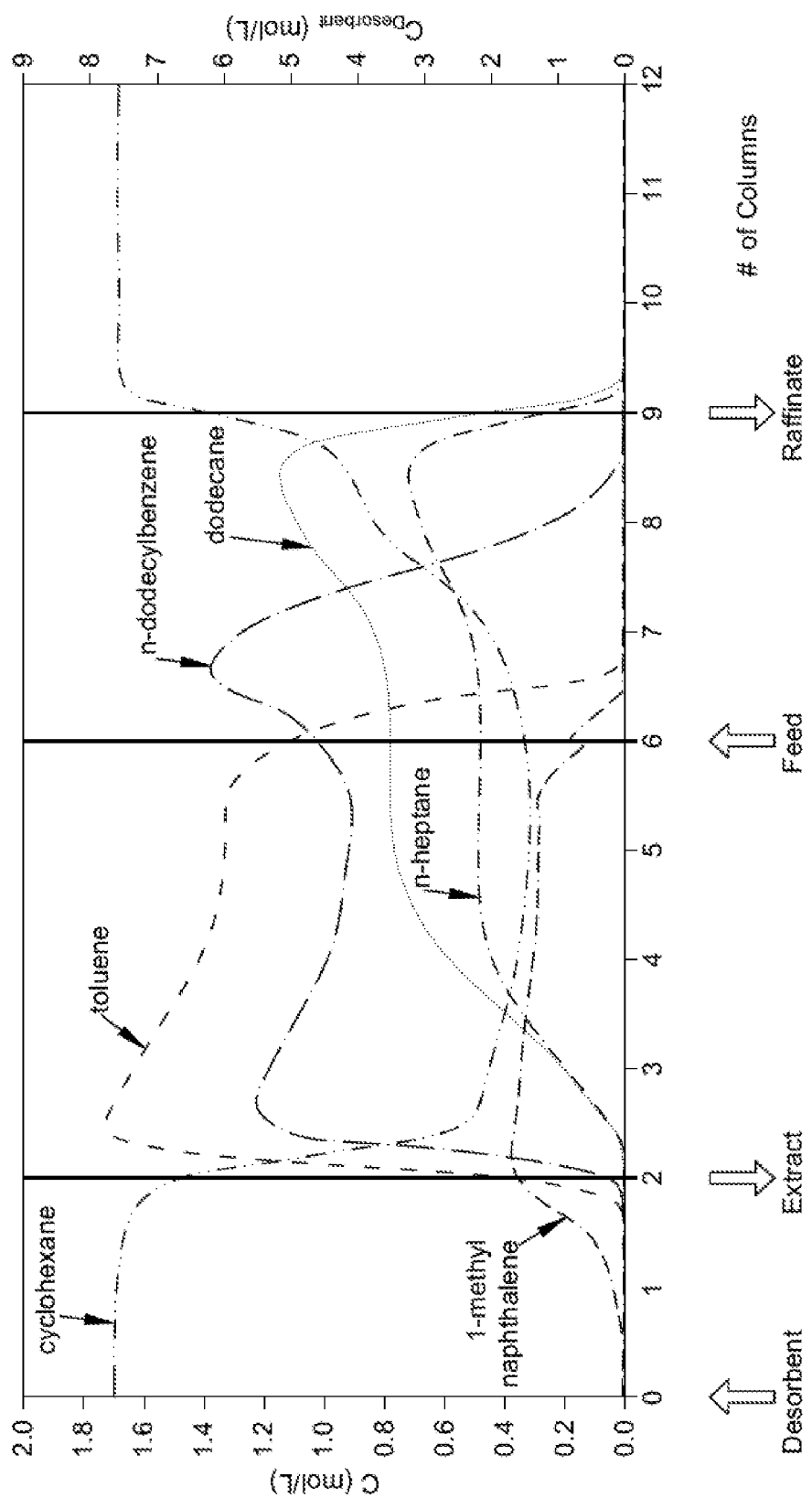
FIG. 8 illustrates a simulated moving bed aromatic-saturates separations simulation.

The SMB model used assumed 12 columns. Each column was the same capacity and defined as 0.26 dm diameter×2.3 dm long. The MOS adsorbent packing was assumed to have 0.367 bulk porosity and 0.514 particle porosity. The SMB column configuration used was 2-4-3-3 for the desorbent, extract, feed, and raffinate zones, respectively, as shown in FIG. 8. Operating temperature was 150° C. using cyclohexane solvent. A column switching time of 1 minute was used in this example. Nineteen cycles were required to achieve stable separation.

FIG. 8 clearly indicates that the saturated feed components are separated from the aromatic components. In this example, virtually all of the n-heptane and n-dodecane obtained in the raffinate stream are resolved from the aromatic components. All of the aromatic components are obtained in the extract stream. It is important to note that the cyclohexane solvent is effective at regenerating the end columns.

The SMB separation is substantially improved when compared with the single column experimental results in Example 6.

SMB separation offers considerable flexibility allowing the overlap of aromatics having substantial aliphatic character to co-elute with the saturates fraction if desired. This could have a significant impact toward creating novel product compositions, particularly for lube applications. In this illustration, the n-dodecylbenzene could be partially eluted in both the aromatic and "saturates" by changing SMB conditions.

This example illustrates the potential of SMB or TMB to achieve separations of saturates and aromatics from pretreated crude oils, essentially free of irreversibly adsorbed components (nitrogen species) or foulants (MCR, metal species), across a very wide molecular weight range (e.g., about 100 g/mol to greater than 1000 g/mol).

Accordingly, the present techniques may be susceptible to various modifications and alternative forms, and the examples discussed above have been shown only by way of example.

However, the present techniques are not intended to be limited to the particular examples disclosed herein. Indeed, the present techniques include all alternatives, modifications, and equivalents falling within the spirit and scope of the appended claims.

The following documents are hereby incorporated by reference in their entirety: U.S. Patent Application Publication Nos. 2010/0218585, 2009/0120842, 2011/0253595; U.S. Pat. Nos. 2,701,786 and 8,177,965; and B J Mair and J D White, NBS Vol. 15, July 1935, "Separation of Petroleum Hydrocarbons with Silica Gel".

What is claimed is:

1. A molecular separation method, comprising:
   passing a deasphalted stream through a reactor containing an active substrate, wherein the catalytic active substrate adsorbs heteroatom species from the deasphalted stream and produces a pretreated hydrocarbon feed stream essentially free of 4+ ring aromatic molecules, metal species, and heteroatom species; and
   chromatographically separating with a simulated moving bed apparatus or a true moving bed apparatus (SMB/TMB) the pretreated hydrocarbon feed stream into a saturate fraction and an aromatics fraction.

2. The method of claim 1 further comprising:
   separating a hydrocarbon feed stream into (a) a retentate stream enriched, relative to the hydrocarbon feed stream, in one selected from the group consisting of 4+ ring aromatic molecules, the metal species, the heteroatom species, and any combination thereof and (b) the deasphalted stream.

3. The method of claim 2, wherein separating the hydrocarbon feed stream comprises passing the hydrocarbon feed stream through an ultrafiltration membrane.

4. The method of claim 2, further comprising:
   mixing the hydrocarbon feed stream with a solvent-range saturates stream comprising C$_5$ to C$_{12}$ saturated hydrocarbons.

5. The method of claim 2, further comprising:
   supplying the retentate stream to a coker, visbreaker, or a deasphalter.

6. The method of claim 2, further comprising:
   separating the saturate fraction with a membrane into a saturates product stream and a solvent-range saturates stream comprising C$_5$ to C$_{12}$ saturated hydrocarbons.

7. The method of claim 6, further comprising:
   supplying the solvent-range saturates stream to one selected from the group consisting of the hydrocarbon feed stream, the reactor, the SMB/TMB, and any combination thereof.

8. The method of claim 6, further comprising:
   halting the passing of the deasphalted stream through the reactor and starting passing the solvent-range saturates stream and optionally a hydrogen stream through the reactor to produce an output stream; and
   hydrotreating or hydrocracking the output stream.

9. The method of claim 1, further comprising:
   separating the aromatics fraction with a membrane into an aromatics product stream and a solvent-range aromatics stream comprising C$_5$ to C$_{12}$ aromatic hydrocarbons.

10. The method of claim 9, further comprising:
    supplying the solvent-range aromatics stream to one selected from the group consisting of the reactor, the SMB/TMB, and any combination thereof.

11. The method of claim 9, further comprising:
    halting the passing of the deasphalted stream through the reactor and starting passing the solvent-range aromatics stream and optionally a hydrogen stream through the reactor to produce an output stream; and
    hydrotreating or hydrocracking the output stream.

12. The method of claim 1, further comprising:
    halting the passing of the deasphalted stream through the reactor and starting passing a hydrogen stream and optionally the solvent-range saturates stream and/or the solvent-range aromatics stream through the reactor;

heating the reactor; and
hydrotreating or hydrocracking in the reactor to produce an output stream.

13. A separation system comprising:
a reactor fluidly configured to receive a deasphalted stream, wherein the reactor contains a catalytic active substrate that adsorbs heteroatom species from the deasphalted stream and produces a pretreated hydrocarbon feed stream essentially free of the 4+ ring aromatic molecules, the metal species, and the heteroatom species; and
a chromatographic separator fluidly coupled to the reactor and configured to receive the pretreated hydrocarbon feed stream and produce a saturate fraction and an aromatics fraction, wherein the chromatographic separator is a simulated moving bed apparatus or a true moving bed apparatus (SMB/TMB).

14. The separation system of claim 13, further comprising:
a first separator configured to receive a hydrocarbon feed stream and separate the hydrocarbon feed stream into (a) a retentate stream enriched, relative to the hydrocarbon feed stream, in one selected from the group consisting of 4+ ring aromatic molecules, metal species, heteroatom species, and any combination thereof and (b) the deasphalted stream.

15. The separation system of claim 14, wherein the first separator is an ultrafiltration membrane.

16. The separation system of claim 13, further comprising:
(i) a second separator comprising a membrane and configured to receive the saturate fraction from the SMB/TMB and produce a saturates product stream and a solvent-range saturates stream comprising $C_5$ to $C_{12}$ saturated hydrocarbons; and/or
(ii) a third separator comprising a membrane and configured to receive the aromatics fraction from the SMB/TMB and produce an aromatics product stream and a solvent-range aromatics stream comprising $C_5$ to $C_{12}$ saturated hydrocarbons.

17. The separation system of claim 16, wherein the reactor is configured to receive the solvent-range saturates stream and/or the solvent-range aromatics stream.

18. The separation system of claim 16, wherein the SMB/TMB is configured to receive the solvent-range saturates stream and/or the solvent-range aromatics stream.

19. The separation system of claim 13, wherein the reactor is configured to receive a hydrogen stream and to be heated to a temperature sufficient to conduct a hydrotreating or hydrocracking reaction.

* * * * *